Oct. 6, 1970  G. A. ROMANCKY  3,531,870
CHAIN SAW MEASURING DEVICE
Filed Jan. 31, 1968
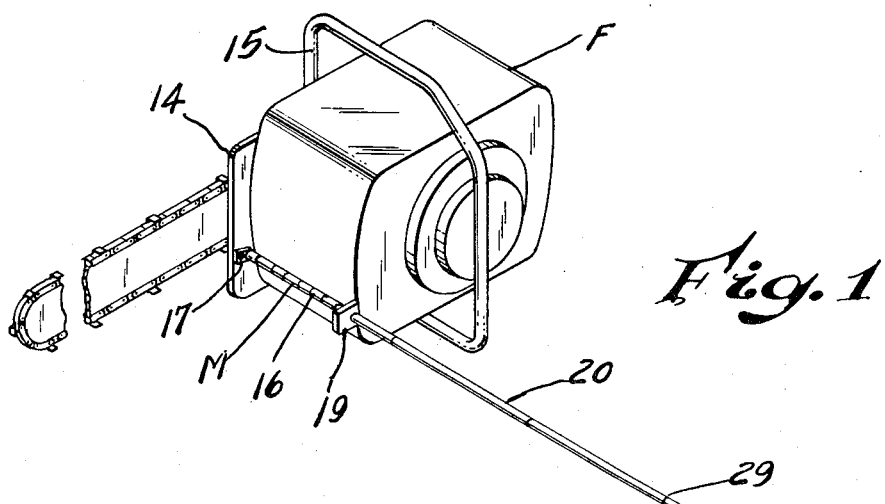
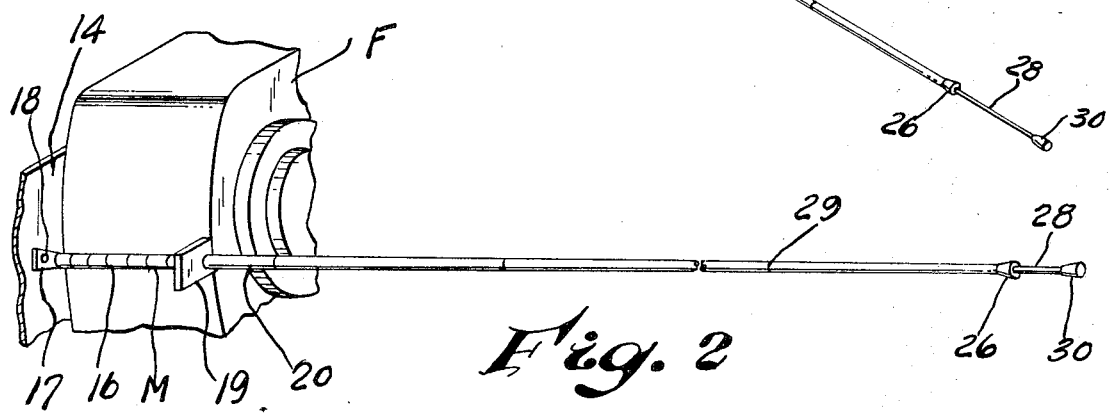
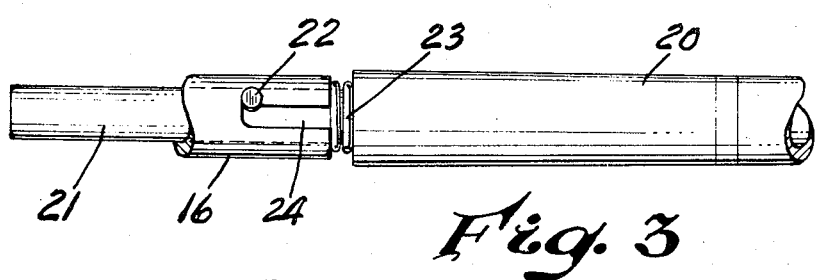
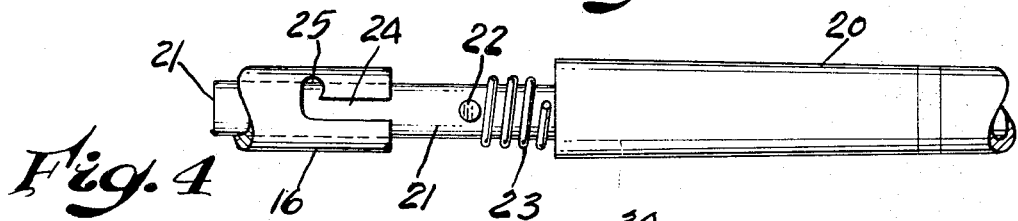
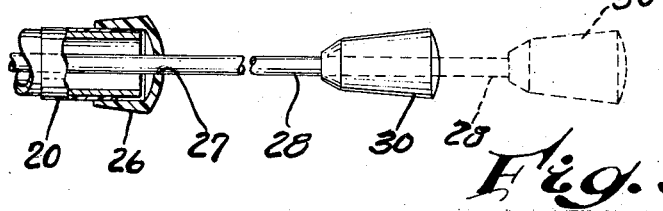
INVENTOR.
George A. Romancky.
BY
Fraarman Fraarman +
McCulloch
ATTORNEYS

United States Patent Office 3,531,870
Patented Oct. 6, 1970

3,531,870
CHAIN SAW MEASURING DEVICE
George A. Romancky, St. Helen, Mich. 48656
Filed Jan. 31, 1968, Ser. No. 701,958
Int. Cl. B27g 23/00
U.S. Cl. 33—185
8 Claims

ABSTRACT OF THE DISCLOSURE

This invention relates to portable chain saws and more particularly to a marking and measuring means provided on the chain frame for adjusting and measuring the sections of the logs or other materials being cut so that the cut sections of the logs will be of uniform predetermined length.

---

One of the prime objects of the invention is to provide for convenient and easy measuring of the log into bolts of predetermined length and which can be readily handled and operated by a workman for cutting up a tree or other material by use of a portable chain saw.

One of the prime objects of the invention is to provide a telescopic measuring pole by means of which the workman can first measure, mark, and then sever the marked sections from each other, and continue to do so until the entire log or other "work" has been cut into a plurality of independent sections of the same length.

Another object of the invention is to provide an expandable adaptor member telescopically and slidably mounted on the rod, and projecting a predetermined distance beyond the end of said rod for resilient connection to a socket member or the like.

A further object of the invention is to design a readily adjustable measuring means composed of telescopically connected inexpensive parts which can be fastened directly to the frame of the saw so that it does not require separate handling, which is always ready for use in measuring position, and which requires but a minimum of space for measuring and/or sawing operations.

A further object is to provide a lightweight, compact and inexpensive means, including a sectional telescopic rod which can be readily and safely handled and operated in heavy brush, and which can be economically manufactured and assembled with the savings incident thereto.

With the above and other objects in view the present invention consists in the combination and arrangement of parts, hereinafter more fully described, illustrated in the accompanying drawing, and more particularly pointed out in the appended claims, it being understood that changes may be made in the form, size, proportion and minor details of construction, without departing from the spirit, or sacrificing any of the advantages of the invention.

In the drawing:

FIG. 1 is a perspective, side elevational view of my measuring and cutting device.

FIG. 2 is a fragmentary, side elevational view thereof, with the handle omitted.

FIG. 3 is an enlarged, fragmentary side elevational view of the rod, telescopic adaptor and locking means in locked position.

FIG. 4 is a view similar to FIG. 3 showing the mechanism in unlocked position.

FIG. 5 is a fragmentary, sectional, side elevational view of the measuring pole, the broken lines showing the cork tip section in extended position.

Referring now more particularly to the drawing in which I have shown a preferred embodiment of my invention. The letter F indicates a portable power saw which includes a frame bar 14, and a handle 15 makes for easy handling and transportation of the chain saw from place to place. The saw includes a plurality of conventional cutting teeth mounted for movement in a vertical plane of travel.

A horizontally disposed, longitudinally extending socket sleeve 16 is connected to the frame bar 14, and includes a laterally projecting heel 17 connected to bar 14 by means of a screw 18 or the like, the opposite end of the sleeve being mounted in a bearing bracket 19 secured in position by welding or the like, said sleeve having one-inch markings M provided thereon, as shown, and while in the present instance I have shown a hollow socket sleeve it will, of course, be understood that this can be designed to telescopically accommodate a rod and measuring pole (not shown), if desired. A tubular rod 20 extends horizontally as shown and is suitably graduated with a plurality of marks, or indicia, as shown at 29, to indicate measured lengths. A reduced tubular cylindrically extension 21 forms an extension of the rod 20 and is telescopically received within socket sleeve 16. A radially extending transversely disposed pin 22 or the like is mounted on the extension 21 and a spring 23 is interposed between the adjacent ends of the sleeve 16 and the tubular extension 20 to hold the members in yieldable, assembled relation when said members are in locked position.

The exposed free end of adaptor 21 is insertable in one end of socket sleeve 16, said sleeve being formed with a horizontally disposed slot 24, the inner closed end of which extends transversely as at 25 to form an offset passage for the locking pin 22 (see FIG. 4 of the drawing). To connect or disconnect the rod 20 from the socket sleeve 16, it is merely necessary to rotate the tubular measuring rod 20 in the proper direction to secure or release the connection. With the pin 22 received in the slot portion 25, the rod 20 is locked in position under the biasing force of the spring 23. With the pin 22 released from the slot portion 25, the pin 22 is freely axially movable along the slot portion 24, thereby permitting the rod 20 and the extension 21 to be slidingly moved to the right as viewed in the drawing. Thus a quick disconnect is provided for disconnecting the rod 20 from the socket sleeve 16.

A resilient adaptor member 26, which may suitably comprise rubber material, is mounted on the outer free end of the hollow measuring rod 20 and is provided with a central opening 27 to slidingly accommodate a measuring pole 28 so that when it is desired to provide a change in length, the operator merely slides the pole 28 in or out of the rod 20 as desired. This pole 28 can be formed of metal, plastic, or any other desired material, and is also marked or graduated in foot lengths with a plurality of marks or indicia as shown at 29, and has a colored cork tip 30 on the free end thereof so that it will be clearly visible to the operator. The pole 28 is readily slidable on the work when in use, and the resilient material forming the member 26 normally expands and biasingly engages the outer surface of the pole 28 to retain the rod in adjusted position.

When the parts are assembled for use, opposite ends of the socket sleeve 16 are connected to the frame bar 14 and the bearing bracket 19, and the tubular rod 20 having the pole 28 slidably mounted therein is connected with the sleeve 16 by sliding the pin 22 through the slot 24 and into the slot portion 25 against the biasing force of the spring 23 exerting pressure on the pin 22. If the workman cuts trees, etc., into eight-foot lengths, he first places the rod 20 in position and then adjusts the measuring pole 28 to provide an eight-foot "bolt." He then marks the log or other material to necessary eight-foot measurements and cuts the entire log without stoppage.

From all of the foregoing it will be clearly obvious that I have perfected an accurate measuring device for use on chain saws when cutting logs and wood sections of all kinds. No snap judgment is necessary in making an exact, accurate cut; merely make the one setting and continuously cut the work.

While I have shown a preferred embodiment of the invention it will be understood that the invention is capable of variation and modification from the form shown so that its scope should be limited only by the scope of the claims appended thereto.

I claim:

1. In combination with a portable saw having a plurality of cutting teeth traveling in a plane for cutting workpieces into bolts of predetermined length:
   a saw housing;
   a longitudinally extending sleeve on said housing including an axially extending slot formed with an offset transversely extending passage therein;
   longitudinally extending measuring means extending perpendicularly to the said plane of travel of said teeth for measuring the length of a workpiece to be cut, and including means extending within said sleeve, said last mentioned means having an outwardly extending locking pin thereon adapted to be slidably received within said passage for releasably connecting said measuring means and said sleeve; and
   spring means mounted between said sleeve and said measuring means to bias said pin in a direction to yieldably maintain said pin in said offset passage.

2. The combination as set forth in claim 1 including an enlarged tip at the end of said measuring means.

3. In combination with a portable saw having a plurality of cutting teeth traveling in a plane for cutting workpieces into bolts of predetermined length:
   a saw housing;
   a longitudinally extending mount supported on said housing extending substantially perpendicularly to the said plane of travel of said teeth for releasably mounting measuring means;
   said longitudinally extending mount being provided with a first plurality of longitudinally spaced graduations for measuring the length of a workpiece to be cut; and
   longitudinally extending measuring means extending substantially perpendicularly to said plane of travel for measuring a predetermined greater length of a workpiece to be cut, releasably connected with said longitudinally extending mount.

4. The combination as set forth in claim 3 wherein said measuring means and said longitudinally extending mount are connected at a point longitudinally spaced from said plane.

5. The combination as set forth in claim 3 wherein said measuring means comprises:
   a graduated tubular rod open at one end and having a reduced extension at the other end slidably mounted in said mount;
   a resilient adapter mounted on the open end of said graduated rod; and
   a graduated measuring pole slidably mounted in said tubular rod and extending through said resilient adapter.

6. The combination as set forth in claim 5 wherein said mount includes a graduated, hollow sleeve adapted to receive said reduced extension and including a longitudinally extending slot terminating in a transversely extending, offset passage, said reduced portion including a locking pin extending therefrom and slidably engageable with said slot, and a spring mounted between said sleeve and said graduated tubular rod.

7. The combination as set forth in claim 3 wherein said measuring means and said longitudinally extending mount are telescopically connected.

8. The combination as set forth in claim 3 wherein said first plurality of graduations are linearly spaced a first predetermined amount; said measuring means being provided with graduations which are linearly spaced a second predetermined greater amount, the end one of said second plurality of graduations nearest said saw being spaced from the end of said measuring means a distance less than said second predetermined amount such that said end one graduation is spaced from said plane a distance equal to said second predetermined amount when said measuring means is connected with said mount.

References Cited

UNITED STATES PATENTS

| | | | |
|---|---|---|---|
| 1,003,626 | 9/1911 | Malcolm | 33—161 |
| 1,583,585 | 5/1926 | Emery | 33—161 |
| 2,518,128 | 8/1950 | Dufilho | 33—161 |
| 2,603,877 | 7/1952 | Gentz | 33—161 |
| 2,736,384 | 2/1956 | Potts | 285—361 X |
| 2,765,007 | 10/1956 | Hoffmann | 33—202 X |

FOREIGN PATENTS 253,201  3/1967  Germany.

WILLIAM D. MARTIN, JR., Primary Examiner

U.S. Cl. X.R.

33—161; 143—32